(12) United States Patent
Nonaka

(10) Patent No.: US 7,733,510 B2
(45) Date of Patent: Jun. 8, 2010

(54) IMAGE-ATTACHED MAIL TRANSITING APPARATUS, IMAGE-ATTACHED MAIL TRANSITING METHOD, AND IMAGE-ATTACHED MAIL TRANSITING PROGRAM

(75) Inventor: Shunichiro Nonaka, Asaka (JP)

(73) Assignee: Fujifilm Corporation, Tokyo (JP)

( * ) Notice: Subject to any disclaimer, the term of this patent is extended or adjusted under 35 U.S.C. 154(b) by 1998 days.

(21) Appl. No.: 10/624,525

(22) Filed: Jul. 23, 2003

(65) Prior Publication Data

US 2004/0105119 A1      Jun. 3, 2004

(30) Foreign Application Priority Data

Jul. 23, 2002   (JP)   ............................. 2002-214215

(51) Int. Cl.
  *G06F 15/00*   (2006.01)
(52) U.S. Cl. ........................ 358/1.15; 358/2.1; 358/402; 709/206; 709/228; 709/230; 379/88.14; 455/557
(58) Field of Classification Search ................ 358/1.15, 358/2.1, 402; 709/206, 228, 230; 379/88.14; 455/557
  See application file for complete search history.

(56) References Cited

U.S. PATENT DOCUMENTS

| | | | | |
|---|---|---|---|---|
| 6,775,705 B2* | 8/2004 | Maeda | ........................ | 709/230 |
| 6,816,885 B1* | 11/2004 | Raghunandan | .............. | 709/206 |
| 6,980,137 B2* | 12/2005 | Parry et al. | .................... | 341/50 |
| 7,117,210 B2* | 10/2006 | DeSalvo | ........................ | 707/10 |
| 2001/0054076 A1* | 12/2001 | Tonegawa | .................... | 709/206 |
| 2001/0056470 A1* | 12/2001 | Ishitani | ........................ | 709/206 |
| 2002/0003535 A1* | 1/2002 | Cho | ........................... | 345/204 |
| 2003/0208546 A1* | 11/2003 | DeSalvo et al. | ............. | 709/206 |

FOREIGN PATENT DOCUMENTS

| | | |
|---|---|---|
| JP | 11-134265 A | 5/1999 |
| JP | 2002-199151 A | 7/2002 |

OTHER PUBLICATIONS

Machine translation of Japanese Patent Document No. 2002-199151, Jul. 12, 2002.*

* cited by examiner

*Primary Examiner*—David K Moore
*Assistant Examiner*—Mark R Milia
(74) *Attorney, Agent, or Firm*—Birch, Stewart, Kolasch & Birch, LLP

(57) ABSTRACT

An image-attached mail transiting apparatus has a mail receiving portion for receiving an image-attached mail transmitted from a transmitting terminal that transmits the image-attached mail to which an image picked up by an installed miniature camera is attached, a mail control portion for extracting an attached image from the image-attached mail, then instructing an image processing portion how to process the attached image, and then substituting a processed image for the original attached image of the image-attached mail, an image processing portion for performing the process indicated by the mail control portion to the image, and a mail transmitting portion for transmitting the image-attached mail to the receiving terminal, whereby the mail control portion discriminates a type of the transmitting terminal, and the image processing portion performs image processing according to the type. It become possible to perform predetermined processing to a picked-up image every camera provided to communication devices.

3 Claims, 3 Drawing Sheets

FIG. 2

| TYPE | FIRST PARAMETER | PROCESS CONTENTS |
|---|---|---|
| AA-01 | 11 | SHARPNESS +3 |
| AA-02 | 12 | R+1 |
| B21 | 13 | SIZE CHANGE |
| B31 | 14 | G-2 |
| B51T | 15 | GIF → JPEG |
| C-401 | 16 | SHARPNESS -1 |
| D01 | | |
| E111 | | |
| ⋮ | ⋮ | ⋮ |

FIG. 3

| TYPE | SECOND PARAMETER | PROCESS CONTENTS |
|---|---|---|
| AA-01 | 21 | 144 x 144 OR LESS   GIF 256 COLOR   7KB OR LESS |
| AA-02 | | |
| C-401 | 22 | 144 x 144 OR LESS   JPEG   7KB OR LESS |
| E111 | 23 | 144 x 144 OR LESS   PNG 256 COLOR   7KB OR LESS |
| - | 24 | IMAGE QUALITY CORRECTION ONLY |
| ⋮ | ⋮ | ⋮ |

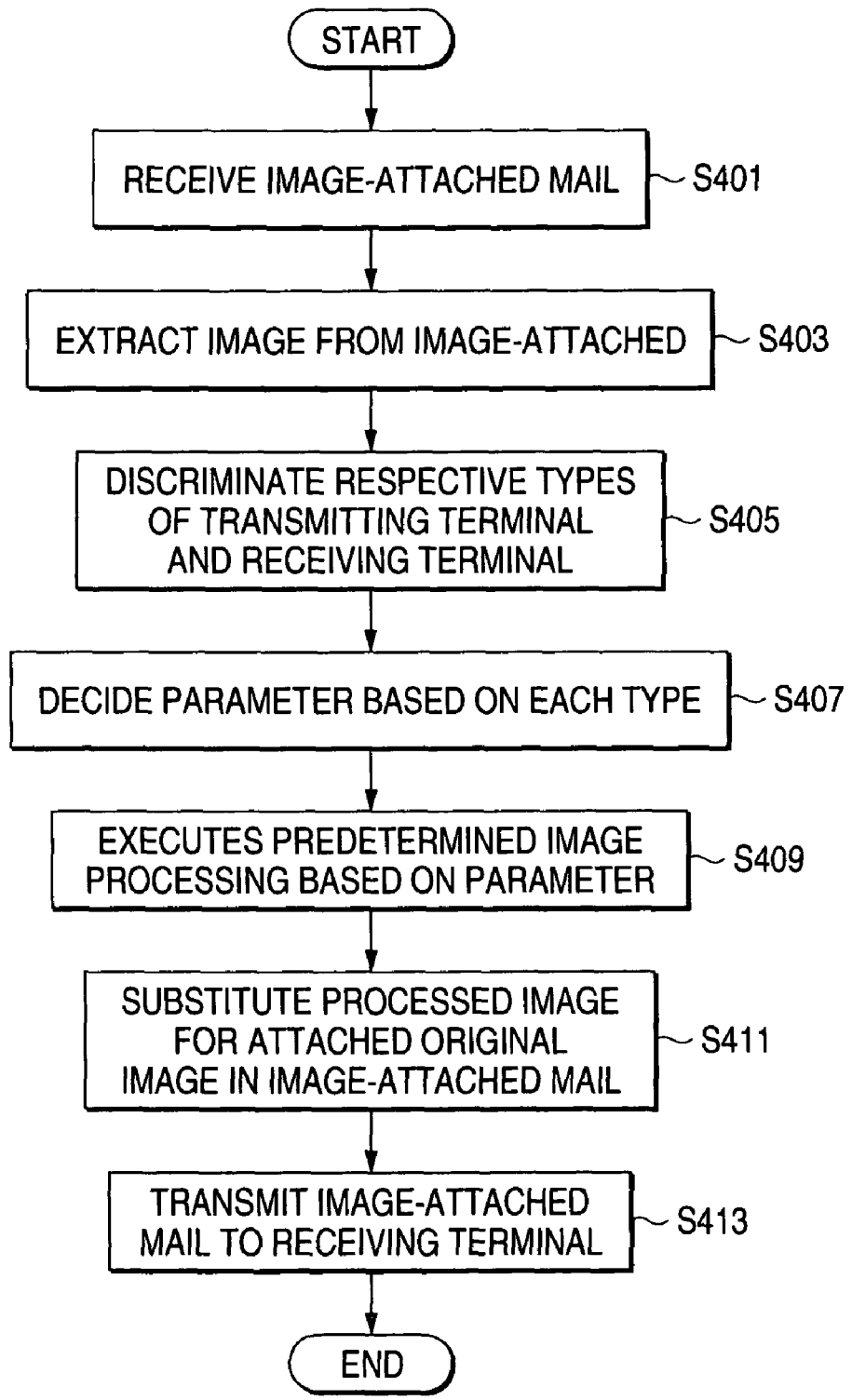

IMAGE-ATTACHED MAIL TRANSITING APPARATUS, IMAGE-ATTACHED MAIL TRANSITING METHOD, AND IMAGE-ATTACHED MAIL TRANSITING PROGRAM

BACKGROUND OF THE INVENTION

1. Field of the Invention

The present invention relates to an image-attached mail transiting apparatus, an image-attached mail transiting method, and an image-attached mail transiting program, which perform predetermined processing for an attached image of an image-attached mail, which is transmitted from a communication device with a camera, according to the performance of the camera.

2. Description of the Related Art

In recent years, improvement in performance of the cellular phone itself and improvement in the cellular phone service make it possible not only to transmit/receive the sound as the original function of the phone but also to transmit/receive E-mail and the image. Until now, the image that is transmitted/received by the cellular phone is the image picked up by the digital camera, or the like. In recent years, since the camera such as the mobile camera, the CCD camera, or the like is installed into the cellular phone, the service of transmitting the image picked up by such a camera to another cellular phone, or the like is provided.

However, since reduction in size and weight is required for the cellular phone, the camera that can be installed into the cellular phone is limited to the miniature camera. In this case, since such miniature camera is inferior in picture quality to the normal digital camera, it is desired that the picked-up image should be processed in some way. In particular, these miniature cameras are different in the performance such as sharpness, focusing function, etc. according to the type of the camera. Therefore, it is desirable that the picked-up image is should be processed in every type of the miniature camera.

SUMMARY OF THE INVENTION

An object of the present invention is to provide an image-attached mail transiting apparatus, an image-attached mail transiting method, and an image-attached mail transiting program, which are capable of performing predetermined image processing for an image attached to an image-attached mail according to a type of a transmitting terminal with a camera, which transmitted the image-attached mail.

The invention provides an image-attached mail transiting apparatus for performing predetermined image processing for an image according to a type of a transmitting terminal with a camera, which transmits E-mail to which the image is attached (referred to as "image-attached mail" hereinafter), has type discriminating means for discriminating the type of the transmitting terminal, which transmits the image-attached mail to be received by the image-attached mail transiting apparatus; parameter deciding means for deciding a first parameter indicating what processing should be performed for an attached image of the image-attached mail according to the type of the transmitting terminal; and image processing means for performing predetermined image processing based on the first parameter for the attached image, wherein an image processed by the image processing means is substituted for the attached image of the image-attached mail, and then the image-attached mail to which a substituted image is attached is transmitted to a receiving terminal.

According to the invention, the predetermined image processing can be performed for the attached image of the image-attached mail according to the type of the transmitting terminal with the camera. Therefore, variation in the image quality due to the difference in the performance of the camera can be suppressed. As a result, such difference in the performance of the camera installed into various types of the transmitting terminals can be absorbed.

Further, the type discriminating means discriminates the type of the receiving terminal having a display, the parameter deciding means decides a second parameter indicating what processing should be performed for the attached image of the image-attached mail according to the type of the receiving terminal, and the image processing means performs predetermined image processing based on the second parameter for the attached image.

Thus, since the predetermined processing are performed for the attached image according to the type of the receiving terminal having the display, the image processing can be executed to meet the performance of the display that is used in the receiving terminal. Therefore, variation in the image quality due to the difference in the performance of the display can be suppressed. As a result, such difference in the performance of the display that are used in various types of the receiving terminals can be absorbed.

Further, the type discriminating means discriminates the type of the receiving terminal having a display, the parameter deciding means decides a parameter indicating what processing should be performed for the attached image of the image-attached mail according to the type of the transmitting terminal and the type of the receiving terminal, and the image processing means performs predetermined image processing based on the parameter for the attached image. Therefore, the predetermined processing can be performed to the attached image according to both the type of the transmitting terminal with the camera and the type of the receiving terminal with the display.

The invention provides an image-attached mail transiting method performing predetermined image processing to an image according to a type of a transmitting terminal with a camera, which transmits E-mail to which the image is attached (referred to as "image-attached mail" hereinafter), has a first type discriminating step of discriminating the type of the transmitting terminal, which transmits the image-attached mail; a first parameter deciding step of deciding a first parameter indicating what processing should be performed for an attached image of the image-attached mail according to the type of the transmitting terminal; a first image processing step of performing the predetermined image processing based on the first parameter for the attached image; an image substituting step of substituting an image processed in the first image processing step for the attached image of the image-attached mail; and a mail transmitting step of transmitting the image-attached mail, to which a substituted image is attached, to the receiving terminal.

Further, the image-attached mail transiting method also has a second type discriminating step of discriminating the type of the receiving terminal having a display; a second parameter deciding step of deciding a second parameter indicating what processing should be performed for the attached image of the image-attached mail according to the type of the receiving terminal; and a second image processing step of performing the predetermined image processing based on the second parameter for the attached image, wherein the image substituting step substitutes an image processed in the first image processing step and the second image processing step for the attached image of the image-attached mail.

Further, the image-attached mail transiting method also has a second type discriminating step of discriminating the type of the receiving terminal having a display, wherein the first parameter deciding step decides a parameter indicating what processing should be performed for the attached image of the image-attached mail according to the type of the transmitting terminal and the type of the receiving terminal, and the first image processing step performs predetermined processing based on the parameter for the attached image.

The invention provides an image-attached mail transiting program which a computer executes the image-attached mail transiting method.

BRIEF DESCRIPTION OF THE DRAWINGS

FIG. 2 is an explanatory view showing a table used in a mail control portion to decide a first parameter;

FIG. 3 is an explanatory view showing a table used in the mail control portion to decide a second parameter; and FIG. 4 is a flowchart explaining an operation of the image-attached mail transiting apparatus according to the embodiment of the present invention.

DETAILED DESCRIPTION OF THE PREFERRED EMBODIMENTS

Figure 1:
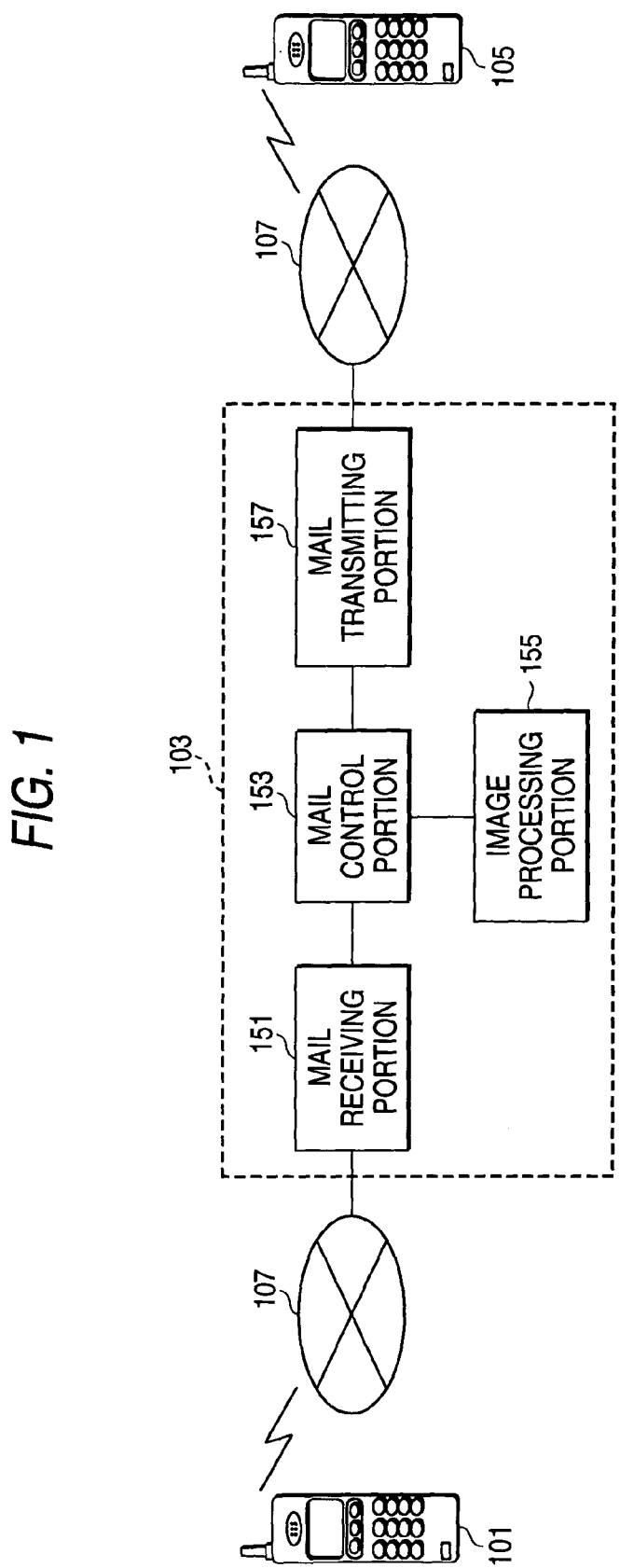
FIG. 1 is a configurative view showing a mail transmitting system utilizing an image-attached mail transiting apparatus according to an embodiment of the present invention.

Embodiment of an image-attached mail transiting apparatus and an image-attached mail transiting method according to the present invention will be explained in detail with reference to the drawings hereinafter.

FIG. 1 is a configurative view showing a mail transmitting system utilizing an image-attached mail transiting apparatus according to an embodiment of the present invention. In FIG. 1, the mail transmitting system of the present embodiment is constructed to include a transmitting terminal 101, an image-attached mail transiting apparatus 103, a receiving terminal 105, and a network 107.

The transmitting terminal 101 and the receiving terminal 105 are the communication device such as the cellular phone, PHS, PDA, or the like, in which the miniature digital camera such as the mobile camera, the CCD camera, or the like (referred simply to as "camera" hereinafter) is installed. These terminals 101 and 105 can transmit/receive E-mail to which the image picked up by the camera is attached (referred to as "image-attached mail" hereinafter) via the network 107 and the image-attached mail transiting apparatus 103.

Also, as shown in FIG. 1, the image-attached mail transiting apparatus 103 of the present embodiment has a mail receiving portion 151, a mail control portion 153, an image processing portion 155, and a mail transmitting portion 157. The image-attached mail transiting apparatus 103 receives the image-attached mail transmitted from the transmitting terminal 101, and then performs predetermined process for the image attached to such image-attached mail. In particular, the predetermined process is image processing that are fitted for the type of the transmitting terminal 101.

Respective constituent elements of the image-attached mail transiting apparatus 103 of the present embodiment will be explained hereunder. The mail receiving portion 151 receives the image-attached mail transmitted from the transmitting terminal 101 via the network 107. The mail control portion 153 extracts the attached image from the image-attached mail, then instructs the image processing portion 155 how to process the attached image, and then substitutes such processed image for the original image attached to the image-attached mail. The image processing portion 155 processes the image with the processing which is instructed by the mail control portion 153. The mail transmitting portion 157 transmits the image-attached mail, to which the image processed by the image processing portion 155 is attached, to the receiving terminal 105 via the network 107.

As described above, the image processing portion 155 provided to the image-attached mail transiting apparatus 103 of the embodiment performs the image processing according to the type of the transmitting terminal 101. In addition to the concerned processing, the image processing portion 155 also performs the image processing according to the type of the receiving terminal 105, and the common image processing that are independent of the types of the transmitting terminal 101 and the receiving terminal 105. Therefore, the mail control portion 153 discriminates the information indicating which type of the terminal the image-attached mail received by the mail receiving portion 151 is transmitted from and which type of the terminal the image-attached mail is transmitted to, etc. by looking up the header of the image-attached mail. In other words, the mail control portion 153 discriminates respective types of the transmitting terminal 101 and the receiving terminal 105 based on the header of the image-attached mail.

After the mail control portion 153 discriminated respective types of the transmitting terminal 101 and the receiving terminal 105, the mail control portion 153 decides a parameter indicating what processing should be performed for the attached image, according to respective types of the transmitting terminal 101 and the receiving terminal 105. In this case, such parameter is separated into a first parameter decided based on the type of the transmitting terminal 101 and a second parameter decided based on the type of the receiving terminal 105.

The mail control portion 153 uses a table shown in FIG. 2 to decide the first parameter. As shown in FIG. 2, in this table, parameters are allocated to every type of the transmitting terminal. For example, a first parameter "11" indicating the image processing portion 155 to increase a sharpness by 3 levels is allocated to the type "AA-01" of the terminal. In this case, plural types into which the same camera is installed may be formed into a group, and then the parameter may be set every group. For example, in FIG. 2, the terminals of three types "C-401", "D01", "E111" are formed into a group, and then a parameter "16" is allocated to this group.

Further, the mail control portion 153 uses a table shown in FIG. 3 to decide the second parameter. As shown in FIG. 3, in this table, parameters are allocated to every type of the receiving terminal. For example, a second parameter "22" indicating the image processing portion 155 to change an image size to 144×144 pixels and 7 KB in the JPEG format is allocated to the type "C-401" of the terminal. In this case, plural types into which the same display is installed may be formed into a group, and then the parameter may be set every group. For example, in FIG. 3, the terminals of two types "AA-01" and "AA-02" are formed into a group, and then a parameter "21" is allocated to this group.

When the first parameter and the second parameter are decided by the mail control portion 153, these parameters are supplied to the image processing portion 155. The image processing portion 155 performs processing to the image, which is predetermined according to these parameters. When the type of the receiving terminal 105 cannot be discriminated by looking up the header of the image-attached mail, the second parameter cannot be decided and therefore the image processing portion 155 performs the image processing based on the first parameter only. In this case, in the above explanation, the parameter is decided separately as the first parameter decided based on the type of the transmitting terminal 101 and the second parameter decided based on the type of the receiving terminal 105. But one parameter may be decided based on respective types of the transmitting terminal 101 and the receiving terminal 105.

Next, an operation of the image-attached mail transiting apparatus 103 (image-attached mail transiting method) of the embodiment will be explained with reference to FIG. 4 hereunder. First, the mail receiving portion 151 receives the image-attached mail (S401). Then, the mail control portion 153 extracts the image from the image-attached mail (S403). Then, the mail control portion 153 discriminates the type of the transmitting terminal 101 and the type of the receiving terminal 105 by looking up the header of the image-attached mail (S405). Then, the mail control portion 153 decides the parameter based on the type discriminated in step S405 (S407).

Then, the image processing portion 155 performs the predetermined image processing to the image extracted in step S403 based on the parameter decided in step S407 (S409). Then, the mail control portion 153 substitutes the image processed in step S409 for the original attached image of the image-attached mail (S411). Then, the mail transmitting portion 157 transmits the image-attached mail derived in step S411 to the receiving terminal 105 (S413).

As described above, according to the image-attached mail transiting apparatus 103 and the image-attached mail transiting method of the embodiment, since predetermined processing are performed for the attached image of the image-attached mail according to the type of the transmitting terminal 101, the image processing can be executed to meet the performance of the camera installed into the transmitting terminal 101. Hence, variation in the image quality due to the difference in the performance of the camera can be suppressed. As a result, the difference in the performance of the camera installed into the transmitting terminals can be absorbed. Therefore, the receiving terminal 105 can obtain the image with better image quality regardless of the type of the transmitting terminal 101.

Also, since the predetermined processing are performed for the attached image according to the type of the receiving terminal 105, the image processing can be executed to meet the performance of the display installed into the receiving terminal 105. Hence, variation in the image quality due to the difference in the performance of the display can be suppressed. As a result, the difference in the performance of the display installed into the receiving terminals can be absorbed. Therefore, the receiving terminal 105 can obtain the image with better image quality regardless of the type of the receiving terminal 105.

The image-attached mail, the image of which is substituted for the processed image, is transmitted from the mail transmitting portion 157. In contrast, the processed image may be stored in an image storing portion (not shown), and then the mail transmitting portion 157 may transmit the mail, which recites URL in which the processed images are stored, etc., to the receiving terminal 105. In this case, when the user who operates the receiving terminal 105 accesses a web server (not shown) based on URL recited in the mail being transmitted from the image-attached mail transiting apparatus 103, etc., the web server reads the processed image stored in the image storing portion and then transmits the image data to the receiving terminal 105.

Therefore, since the user of the receiving terminal 105 can see the image attached to the image-attached mail, the corresponding service can be provided to the receiving terminal that cannot receive the image-attached mail. In this case, the image stored in the image storing portion is processed by using the first parameter explained in the above, while the image processing based on the second parameter are performed when the request to see the image is issued from the user of the receiving terminal 105.

What is claimed is:

1. An image-attached mail transiting apparatus for performing predetermined image processing for an attached image according to a type of a transmitting terminal with a camera, which transmits an E-mail to which the image is attached, comprising:

a type discriminating unit that discriminates, based on a header of the E-mail, the type of the transmitting terminal which transmits the E-mail to be received by the image-attached mail transiting apparatus and the type of the receiving terminal having a display;

a parameter deciding unit that decides a first parameter indicating what processing should be performed for the attached image of the E-mail according to the type of the transmitting terminal; and an image processing unit that performs predetermined image processing based on the first parameter for the attached image, wherein the image processed by the image processing unit is substituted for the attached image of the E-mail, and then the altered E-mail, to which the substituted image is attached, is transmitted to a receiving terminal, first groups are set so that at least one of the first groups includes plural types of transmitting terminals, fifth parameters are allocated to the first groups, respectively, and the parameter deciding unit decides the first parameter from the fifth parameters allocated to the respective first groups according to the discriminated type of the transmitting terminal, second groups are set so that at least one of the second groups includes plural types of receiving terminals, fourth parameters are allocated to the second groups, respectively, the parameter deciding unit decides a third parameter from among the fourth parameters allocated to the respective second groups, according to the discriminated type of the receiving terminal, each of the fourth parameters indicates what processing should be performed for the attached image of the E-mail according to the allocated second groups, and the image processing unit performs predetermined image processing based on the decided third parameter for the attached image.

2. An image-attached mail transiting method of performing predetermined image processing for an image according to a type of a transmitting terminal with a camera, which transmits an E-mail to which the image is attached, comprising:

discriminating, based on a header of the E-mail, the type of the transmitting terminal which transmits the E-mail;

deciding a first parameter indicating what processing should be performed for an attached image of the E-mail according to the type of the transmitting terminal;

performing predetermined image processing based on the first parameter for the attached image;

substituting an image processed in the first image processing step for the attached image of the E-mail;

transmitting an altered E-mail, to which a substituted image is attached, to a receiving terminal;
setting first groups so that at least one of the first groups includes plural types of transmitting terminals; and
allocating fifth parameters to the first groups, respectively,
wherein the first parameter is decided from the fifth parameters allocated to the respective first groups, according to the discriminated type of the transmitting terminal; and
discriminating, based on the header of the E-mail, a type of the receiving terminal having a display;
setting second groups so that at least one of the second groups includes plural types of receiving terminals;
allocating fourth parameters to the second groups, respectively; and
deciding a third parameter from among the fourth parameters allocated to the respective second groups, according to the type of receiving terminal; and
performing predetermined image processing based on the decided third parameter for the attached image,
wherein each of the fourth parameters indicates what processing should be performed for the attached image of the E-mail according to the allocated second groups.

3. A computer executable image-attached mail transiting program stored on a computer-readable medium, wherein the computer program, when executed, causes the computer to execute the image-attached mail transiting method set forth in claim 2.

* * * * *